Patented Jan. 9, 1951

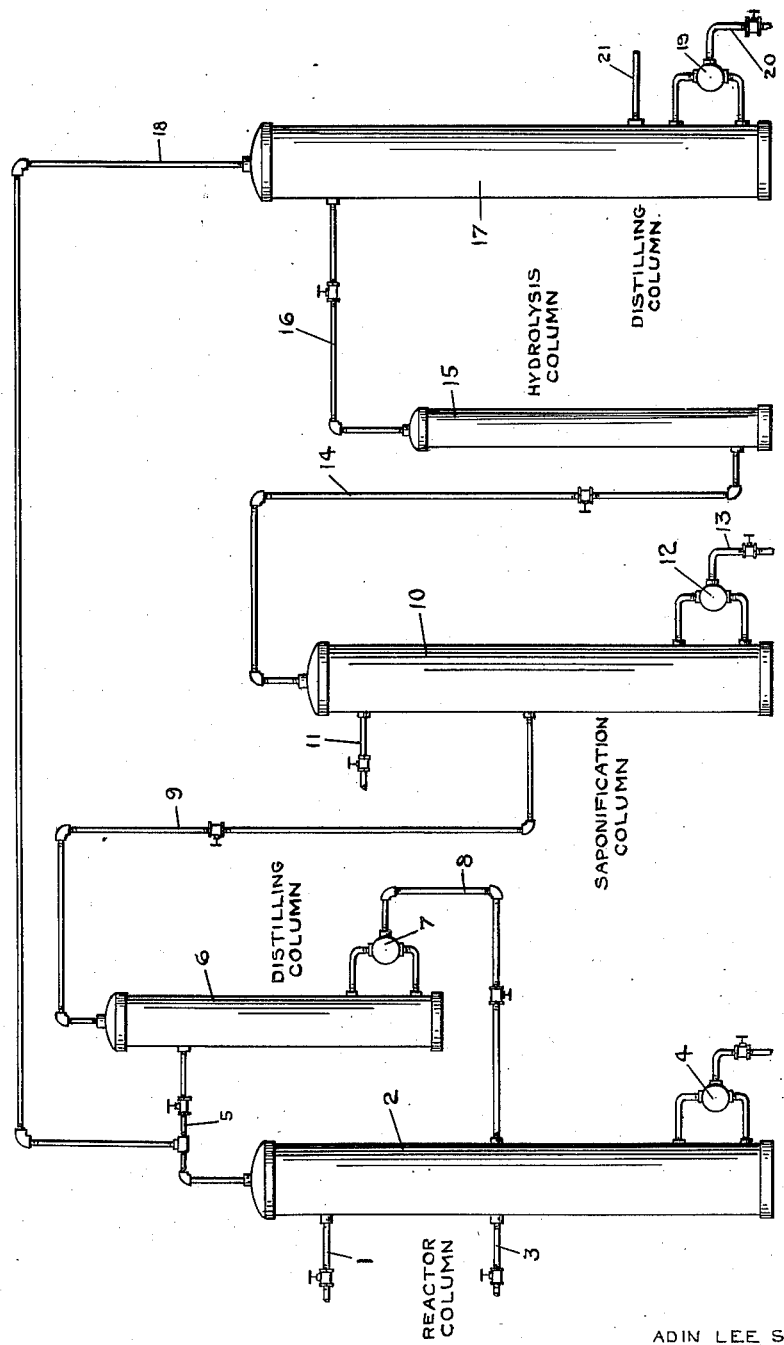

2,537,169

UNITED STATES PATENT OFFICE 2,537,169

PROCESS FOR PURIFICATION OF FORMALDEHYDE

Adin Lee Stautzenberger, Corpus Christi, and Alexander F. MacLean, Robstown, Tex., assignors to Celanese Corporation of America, a corporation of Delaware Application November 12, 1947, Serial No. 785,238

8 Claims. (Cl. 260—606)

This invention relates to the treatment of dilute aqueous solutions of formaldehyde and relates more particularly to an improved process for the purification and concentration of dilute aqueous formaldehyde solutions obtained as a product of the partial oxidation of hydrocarbons.

During the partial oxidation of hydrocarbons, such as propane and butane, at elevated temperature and pressure with the aid of a controlled amount of air, products such as formaldehyde, acetaldehyde, propionaldehyde, acetone, acetic acid and other organic compounds such as methyl, isopropyl and propyl alcohol are produced. The gaseous reaction mixture formed is usually partially absorbed in water to separate the major portion of formaldehyde present from the other components of the gaseous reaction mixture and the remaining oxygenated organic compounds are then subjected to a series of purification processes whereby they are separated into pure products. During the formaldehyde absorption step some methanol and formic acid and other light and heavy ends present in the gaseous reaction mixture are also absorbed. The heavy ends which are absorbed consist of resins, oils and other by-products. The heavy ends as well as the methanol and formic acid present must be separated in order to obtain a purified and commercially acceptable concentrated aqueous formaldehyde solution. Such separation, purification and concentration of the crude aqueous formaldehyde solution normally involves a considerable number of distillation and extraction operations which renders the process costly and time consuming. Accordingly, a more satisfactory process for the purification and concentration of dilute aqueous formaldehyde solutions obtained as a product of said hydrocarbon partial oxidation process which permits the purification and concentration to be achieved in a more efficient and economical manner has long been sought.

It is an important object of this invention to provide an improved process for the purification and concentration of the crude, dilute aqueous solutions of formaldehyde obtained during the partial oxidation of hydrocarbons whereby oxygenated organic compounds are formed.

Another object of this invention is the production of a concentrated aqueous formaldehyde solution free of unsaturated compounds and of various impurities yielding undesirable colored reaction products when treated with sulfuric acid.

Other objects of this invention will appear from the following detailed description and the accompanying drawing which is a diagrammatic flow-sheet for carrying out the novel process of our invention.

We have now found that the crude, dilute aqueous solutions of formaldehyde obtained during the separation of the gaseous reaction mixture produced by the partial oxygenation of hydrocarbons may be purified and concentrated into aqueous formaldehyde of a high degree of purity by a novel chemical purification process. In accordance with our novel process, we react the crude, dilute aqueous solution of formaldehyde containing the several undesirable impurities mentioned with a suitable quantity of methyl alcohol in the presence of sulfuric acid or hydrochloric acid as a catalyst, whereby methylal is formed, separate an aqueous solution of methylal from the resulting reaction mixture, hydrolyze the methylal to yield formaldehyde and methyl alcohol and then separate the formaldehyde obtained from the methyl alcohol and any unreacted methylal remaining. By our novel purification process, there is obtained highly purified aqueous formaldehyde which is free of unsaturated compounds and those undesirable oily impurities yielding colored reaction products when the formaldehyde is treated with sulfuric acid. Our novel process is highly efficient and eliminates the necessity for employing the complicated physical process hitherto essential for the purification and concentration of the crude, aqueous formaldehyde solutions obtained as a product of the hydrocarbon partial oxidation process.

In the conversion of the formaldehyde to methylal, we preferably employ from 2 to 10 mols of methyl alcohol for each mol of formaldehyde contained in the crude, aqueous formaldehyde solution undergoing reaction. The crude, aqueous solution subjected to the said reaction normally contains from 5 to 20% by weight of formaldehyde as well as small amounts of methyl alcohol. Thus, only sufficient methyl alcohol need be added to the crude aqueous formaldehyde solution to yield a reaction mixture containing the desired mol ratio of methyl alcohol to formaldehyde. A part of the methyl alcohol in the resulting aqueous reaction mixture formed reacts with any formic acid present in the crude aqueous formaldehyde to form methyl formate. Preferably, the methylal reaction is effected at a temperature of 70 to 100° C. employing 1 to 15 mol per cent, based on the formaldehyde present, of sulfuric acid or hydrochloric acid as a catalyst to aid said reaction.

In order to separate the methylal, thus formed, from methyl formate and other undesirable impurities present, the product is subjected to saponification, employing sodium hydroxide preferably, to effect the saponification. The saponification affects a splitting of the methyl formate and methyl alcohol and formic acid is obtained. The methylal and methyl alcohol are separated as an aqueous distillate when the reaction mixture is distilled and the formic acid is removed as sodium formate in aqueous solution from the base of the still employed.

To regenerate the formaldehyde from the methylal, the aqueous methyl alcohol and methylal distillate is vaporized and subjected to hydrolysis in the vapor state with the aid of a suitable acid hydrolysis catalyst such as phosphoric acid, potassium acid sulfate on pumice, silica gel or phosphoric acid on inactivated alumina. Preferably, we employ pumice impregnated with a 10 to 50% by weight aqueous solution of phosphoric acid as the hydrolysis catalyst. The vapor phase hydrolysis may be effected at a temperature of 100 to 300° C. and preferably, 150 to 200° C., with the vapors having a space velocity of 5 to 50, as measured in terms volumes of the vaporized mixture undergoing hydrolysis per volume of catalyst per minute at normal temperature and pressure. The hydrolysis is preferably effected with from 2 to 10 mols of water being present in the vaporized mixture undergoing hydrolysis for each mol of methylal present therein. The hydrolysis product is then fed to a suitable distilling column where the regenerated formaldehyde produced by the hydrolysis reaction is continuously separated from the methyl alcohol and any unreacted methylal present. Aqueous solutions containing 10 to 50% by weight of formaldehyde substantially free of methyl alcohol are obtained as the residue. The formaldehyde is of a very high degree of purity and is free of unsaturated compounds and those oily hydrocarbon oxidation reaction products yielding an undesirable color on reaction with sulfuric acid.

Referring now to the drawing, wherein there is shown a preferred embodiment of apparatus for carrying out the novel process of our invention, 390 parts by weight per minute of an aqueous 11.3% by weight solution of formaldehyde containing 3 mol per cent of hydrochloric or sulfuric acid on the formaldehyde, together with some formic acid, are continuously fed through an inlet pipe 1 into a reactor column 2 and a sufficient quantity of methyl alcohol is continuously introduced through an inlet pipe 3 to yield the desired ratio of methyl alcohol to formaldehyde in the reaction mixture. The mixture which is continuously formed contains a ratio of greater than two mols of methyl alcohol for each mol of formaldehyde present. The reaction mixture is heated to reaction temperature by means of a steam coil in a reboiler 4 at the base of reactor 2. The mixture of methylal, methyl formate and unreacted methyl alcohol formed distills over and the vapors are introduced through an inlet 5 into a distilling column 6. The mixture is distilled and the methylal and methyl formate come over as the distillate. The unreacted methyl alcohol is recycled from the reboiler 7 through a line 8 back into reactor column 2. Thus, the methyl alcohol introduced through pipe 3 is only sufficient to make up for loss in the product and any leakage.

The overhead product from distilling column 6 is fed through a line 9 into a saponification column 10. Saponification of the methyl formate to form methyl alcohol and sodium formate is effected by means of an aqueous solution of sodium hydroxide introduced into the saponification column 10 through an inlet 11. A mixture of methyl alcohol, water and methylal is distilled over, heat being applied by a steam coil in reboiler 12. The aqueous sodium formate solution going to the base of column 10 is removed through a take-off line 13.

The vaporized mixture of methyl alcohol, methylal and water from saponification column 10 is then introduced through a line 14 into the base of a heated hydrolysis column 15 containing a hydrolysis catalyst comprising pumice impregnated with a 10% by weight aqueous solution of phosphoric acid. The vapors are maintained at a temperature of about 150° C. and, in passing over the hydrolysis catalyst, the vaporized methylal is hydrolyzed to yield formaldehyde and methyl alcohol. The hydrolysis products are then passed through a line 16 into a distilling column 17 where water, methyl alcohol and unreacted methylal is separated overhead and recycled to 5 through take-off line 18 so as to enter column 6 where methylal and methyl alcohol are separated. A side-stream is removed from reboiler 19 through a take-off line 20 and may be recycled, if desired, to the reactor column 2. The purified aqueous formaldehyde leaves column 17 as the vapor from the reboiler 19 through a line 21 and may then be passed through a suitable condenser (not shown) and then to storage. The aqueous formaldehyde vapors are removed from the lower part of column 17 as it is not desirable to remove the liquid product from a reboiler of a column. Aqueous formaldehyde solutions of a concentration of 10 to 50% by weight and of a high degree of purity may be readily obtained. The purified formaldehyde is entirely free of any impurities which identify the formaldehyde as coming from hydrocarbon oxidation processes.

It is to be understood that the foregoing detailed description is given merely by way of illustration and that many variations may be made therein without departing from the spirit of our invention.

Having described our invention, what we desire to secure by Letters Patent is:

1. Process for the purification and concentration of aqueous formaldehyde, which comprises reacting a crude, dilute aqueous solution of formaldehyde with methyl alcohol in the presence of an acid catalyst whereby methylal is formed, distilling off a mixture of methylal, methyl alcohol, water and any methyl formate formed, subjecting said aqueous distillate mixture to saponification, distilling an aqueous solution of methylal from the saponification reaction product, hydrolyzing the methylal distillate to form an aqueous solution of methyl alcohol and formaldehyde, stripping off methyl alcohol and unreacted methylal, and then distilling purified aqueous formaldehyde from the stripped hydrolysis reaction product.

2. Process for the purification and concentration of aqueous formaldehyde, which comprises reacting a crude, dilute aqueous solution of formaldehyde with methyl alcohol in the presence of hydrochloric acid as a catalyst whereby methylal is formed, distilling off a mixture of methylal, methyl alcohol, water and any methyl formate formed, subjecting said aqueous distillate to saponification, distilling an aqueous solution of methylal from the saponification reaction product, hydrolyzing the methylal distillate to form an aqueous solution of methyl alcohol and formaldehyde, stripping off methyl alcohol and unreacted methylal, and then distilling purified aqueous formaldehyde from the stripped hydrolysis reaction product.

3. Process for the purification and concentration of aqueous formaldehyde, which comprises reacting a crude, dilute aqueous solution of formaldehyde with methyl alcohol in the presence of hydrochloric acid as a catalyst whereby methylal is formed, distilling off a mixture of methylal, methyl alcohol, water and any methyl formate formed, subjecting said aqueous distillate to saponification, distilling an aqueous solution of methylal from the saponification reaction product, hydrolyzing the methylal distillate in the vapor phase to form an aqueous solution of methyl alcohol and formaldehyde, stripping off methyl alcohol and unreacted methylal, and then distilling purified aqueous formaldehyde from the stripped hydrolysis reaction product.

4. Process for the purification and concentration of aqueous formaldehyde, which comprises reacting a crude, dilute aqueous solution of formaldehyde with methyl alcohol in the presence of hydrochloric acid as a catalyst whereby methylal is formed, distilling off a mixture of methylal, methyl alcohol, water and any methyl formate formed, subjecting said aqueous distillate to saponification, distilling an aqueous solution of methylal from the saponification reaction product, hydrolyzing the methylal distillate in the vapor phase employing phosphoric acid on a carrier as the hydrolysis catalyst to form an aqueous solution of methyl alcohol and formaldehyde, stripping off methyl alcohol and unreacted methylal, and then distilling purified aqueous formaldehyde from the stripped hydrolysis reaction product.

5. Process for the purification and concentration of aqueous formaldehyde, which comprises reacting a crude, dilute aqueous solution of formaldehyde with 2 to 10 mols of methyl alcohol for each mol of formaldehyde present, in the presence of hydrochloric acid as a catalyst, whereby methylal is formed, distilling off a mixture of methylal, methyl alcohol, water and any methyl formate formed, subjecting said aqueous distillate mixture to saponification, distilling an aqueous solution of methylal from the saponification reaction product, hydrolyzing the methylal distillate in the vapor phase, employing phosphoric acid on a carrier as the hydrolysis catalyst to form an aqueous solution of methyl alcohol and formaldehyde, stripping off methyl alcohol and unreacted methylal, and then distilling purified aqueous formaldehyde from the stripped hydrolysis reaction product.

6. Process for the purification and concentration of aqueous formaldehyde, which comprises reacting a crude, dilute aqueous solution of formaldehyde with 2 to 10 mols of methyl alcohol for each mol of formaldehyde present in the presence of hydrochloric acid as a catalyst at a temperature of 70 to 100° C. whereby methylal is formed, distilling off a mixture of methylal, methyl alcohol, water and any methyl formate formed, subjecting said aqueous distillate mixture to saponification, distilling an aqueous solution of methylal from the saponification reaction product, hydrolyzing the methylal distillate in the vapor phase employing phosphoric acid on a carrier as the hydrolysis catalyst to form an aqueous solution of methyl alcohol and formaldehyde, stripping off methyl alcohol and unreacted methylal, and then distilling purified aqueous formaldehyde from the stripped hydrolysis reaction product.

7. Process for the purification and concentration of aqueous formaldehyde, which comprises reacting a crude, dilute aqueous solution of formaldehyde with 2 to 10 mols of methyl alcohol for each mol of formaldehyde present in the presence of hydrochloric acid as a catalyst at a temperature of 70 to 100° C. whereby methylal is formed, distilling off a mixture of methylal, methyl alcohol, water and any methyl formate formed, subjecting said aqueous distillate mixture to saponification, distilling an aqueous solution of methylal from the saponification reaction product, hydrolyzing the methylal distillate in the vapor phase at a temperature of 150 to 200° C. employing phosphoric acid on a carrier as the hydrolysis catalyst to form an aqueous solution of methyl alcohol and formaldehyde, stripping off methyl alcohol and unreacted methylal, and then distilling purified aqueous formaldehyde from the stripped hydrolysis reaction product.

8. Process for the purification and concentration of aqueous formaldehyde, which comprises reacting a crude, dilute aqueous solution of formaldehyde with 2 to 10 mols of methyl alcohol for each mol of formaldehyde present in the presence of 1 to 15 mol percent hydrochloric acid, based on the formaldehyde present, as a catalyst at a temperature of 70 to 100° C. whereby methylal is formed, distilling off a mixture of methylal, methyl alcohol, water and any methyl formate formed, subjecting said aqueous distillate mixture to saponification, distilling an aqueous solution of methylal from the saponification reaction product, hydrolyzing the methylal distillate in the vapor phase at a temperature of 150 to 200° C. with 2 to 10 mols of water being present for each mol of methylal and employing phosphoric acid on a carrier as the hydrolysis catalyst to form an aqueous solution of methyl alcohol and formaldehyde, stripping off methyl alcohol and unreacted methylal, and then distilling purified aqueous formaldehyde from the stripped hydrolysis reaction product.

ADIN LEE STAUTZENBERGER.
ALEXANDER F. MacLEAN.

REFERENCES CITED

The following references are of record in the file of this patent:

UNITED STATES PATENTS

| Number | Name | Date |
|---|---|---|
| 2,307,937 | Marvel | Jan. 12, 1943 |

OTHER REFERENCES

Senkus: "Ind. and Eng. Chemistry," vol. 38, No. 9 (1946), pages 913 to 916.

Naidus: "Chem. Abstracts," vol. 32, page 6400 (1938).